United States Patent [19]

Narayan

[11] 3,958,153
[45] May 18, 1976

[54] METHOD AND APPARATUS FOR FAULT DETECTION IN A THREE-PHASE ELECTRIC NETWORK

[75] Inventor: Venkat Narayan, Spreitenbach, Switzerland

[73] Assignee: Brown, Boveri & Co., AG, Baden, Switzerland

[22] Filed: May 14, 1974

[21] Appl. No.: 469,780

[30] Foreign Application Priority Data
June 7, 1973 Switzerland.................... 8249/73

[52] U.S. Cl. .................... 317/27 R; 317/36 D
[51] Int. Cl.² .................... H02H 3/28
[58] Field of Search.................... 317/27 R, 36 D, 31, 317/32

[56] References Cited
UNITED STATES PATENTS

| | | |
|---|---|---|
| 3,178,616 | 4/1965 | Blackburn et al. ............. 317/36 D |
| 3,210,606 | 10/1965 | Calhoun........................ 317/36 D |
| 3,612,989 | 10/1971 | Souillard et al................ 317/36 D |
| 3,629,658 | 12/1971 | Helge et al.................... 317/36 D |
| 3,633,072 | 1/1972 | Duncan......................... 317/31 X |

*Primary Examiner*—R. N. Envall, Jr.
*Assistant Examiner*—Harry Moose
*Attorney, Agent, or Firm*—William R. Woodward

[57] ABSTRACT

The voltage-to-ground or neutral of one phase conductor of a three-phase line is compared with the mesh or interphase voltage of the other two phases on an amplitude basis and the comparison result is used to trigger a threshold switch if the former is much smaller than the latter. The threshold switch may be connected to the selector of an excitation system of a network protection assembly or a nonselective excitation system may utilize the outputs of the threshold switches for each of the three comparisons, in order to produce selective triggering of a network protection assembly.

14 Claims, 9 Drawing Figures

METHOD AND APPARATUS FOR FAULT DETECTION IN A THREE-PHASE ELECTRIC NETWORK

This invention concerns a method for detecting or determining faults in a three-phase network which, in dependence on voltage ratios in the network in the case of a fault having occurred in a supervised part of the network, causes at least one fault signal to be generated which is attributed to the occurrence and/or the determination of this fault. The invention also concerns a device for carrying out such a method.

The term "fault detection" in this context refers to the generation of a signal upon the occurrence of a fault, and the term "fault determination" to the identification of such a fault according to type and/or location. "Network" in this context means an electric power transmission line or distribution network.

Fault detection, as a first step in the functional sequence of a network protection system, is usually accomplished by observing an overcurrent or a voltage drop in relation to given absolute values, whereas fault determination is accomplished by circuits alerted by fault detection and is followed in appropriate instances by subsequent selective disconnection. Conventionally, voltage measurements are carried out on the various "phases" of a 3-phase transmission network or line and, for the purpose of fault location in a certain section of the network or line, the phases of two alternating volages derived from the network voltages are determined (e.g. distance determination for distant protection).

Basically, the evaluation of absolute current and voltage masurements in relation to predetermined fixed values is subject to a comparatively high degree of uncertainty, because the fluctuations encountered in normal operation are generally not capable of sufficiently accurate determination to avoid overlapping with values corresponding to a fault situation. Similar considerations apply also to fault determination insofar as absolute measurements and limit-related circuits are used. Finally, fault localization by phase determination of alternating voltages is likewise dependent upon the availability of sufficiently high network voltages even in a fault situation. Moreover, this method, at any rate with regard to the customary distance relays, requires undesirably complex circuitry.

It is the object of the present invention to provide a method and a device for the detection and/or determination of faults which, essentially, is based on relative masurements and, consequently, is less dependent on the fluctuations of absolute values resulting from a fault and which, moreover, is characterized by a less complex functional sequence and simpler circuitry. According to the invention, in the case of a method of the type referred to, a signal derived from a phase voltage (i.e. a voltage on one "phase" conductor) is compared with a signal derived from another network voltage, and especially from an interphase voltage, and a comparison signal is derived from the said two signals which characterizes a relationship between the two compared signals, and this comparison signal is compared with a critical value, whereupon a fault signal is generated depending on the result of this comparison. Accordingly, the device of the invention is characterized by an amplitude comparison circuit with an input to which a phase voltage is applied and another input to which another network voltage, especially the interphase voltage of the other two phases, is applied, the output of the said circuit being connected to a threshold switch.

The invention is based on the surprising discovery that much information, not only concerning the occurrence of a fault as such, but also the location of the fault in a region adjacent the measuring position, can be gained merely by comparing the values of a phase voltage and another network voltage, the latter being either another phase voltage or a voltage between phases. This introduces the substantial advantage that the network voltages in question can be rectified and further processed in the shape of direct-voltage signals, no longer subject to phase variations and noise.

The invention will now be explained in further detail with reference to embodiments thereof and to the annexed drawings.

Figure 1A:
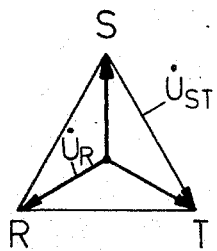
FIGS. 1a to 1d show vector diagrams for the various operational conditions of a three-phase system, representing cases in which the method of the invention can be applied.
Figure 1B:
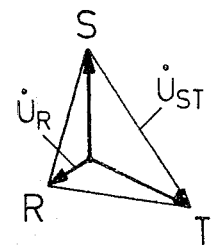

FIG. 1a is the symmetrical vector diagram of the three-phase system with phases RST and the corresponding phase voltages $\dot{U}_R$, $\dot{U}_S$ and $\dot{U}_T$ and the interphase voltages $\dot{U}_{RS}$, $\dot{U}_{ST}$, $\dot{U}_{TR}$. When a short-circuit to earth occurs exclusively on phase R the associated phase voltage at the test location to which the illustrated diagram applies drops to a low fraction of its normal value, whereas the interphase voltages $\dot{U}_{RS}$ and $\dot{U}_{TR}$ decrease only little and the interphase voltage $\dot{U}_{ST}$ remains unchanged. We shall therefore base our discussion on a comparison of the phase voltage $\dot{U}_R$ with a percentage determined by a proportionality factor $k$ of the interphase voltage $\dot{U}_{ST}$. Actually, even a comparison between the phase voltage concerned and one of the other two interphase voltages would be possible, although the fault-related significant variation of the difference or the ratio between the two compared signals in normal operation on the one hand and in the fault condition on the other would not be as large as in the former case. Even a comparison between the voltage concerned and another phase voltage would be feasible.

Figure 2A:
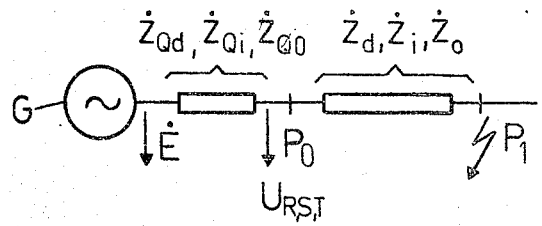
FIG. 2a shows the equivalent circuit of a supervised line section with associated source, symbolizing the conditions in the case of a single-phase short-circuit to earth.

The derivation takes place by referring to FIG. 2a and the values indicated therein, i.e. the EMF "$\dot{E}$" of the generator G, the positive (or direct) phase sequence, negative (or inverse) phase sequence and zero phase sequence source impedances $\dot{Z}_{Qd}$, $\dot{Z}_{Qi}$, $\dot{Z}_{Qo}$ and the positive phase sequence, negative phase sequence and zero phase sequence line impedances $\dot{Z}_d$, $\dot{Z}_i$, $\dot{Z}_o$ between the test location $P_o$ and the fault location $P_1$. The dots shown above symbols representing voltages indicate that a vector is involved, as distinguished from $k$, for example, which is a scalar quantity, and from the amplitudes to be compared, which are likewise scalar. This distinction is important for the mathematical derivation that follows, but is ommitted as unnecessary in the description of FIGS. 3, 4 and 5.

The fault or arc resistance is assumed to have been taken into account in the above-quoted line impedance. We further assume for the positive phase sequence, negative phase sequence and zero phase sequence current the relationship $\dot{I}_1 = \dot{I}_2 = \dot{I}_o = \dot{I}$. Thus we obtain for the voltages $\dot{U}_1, \dot{U}_2$ and $\dot{U}_o$ of the three sets of relationships and for the phase voltages already mentioned the following relationships:

$$\dot{U}_1 = \dot{E} - \dot{I} \times \dot{Z}_{Qd} = \dot{I} \times (\dot{Z}_{Qd} + \dot{Z}_d + \dot{Z}_{Ql} + \dot{Z}_l + Z_{Qo} + Z_o - \dot{Z}_{Qd})$$

$$\dot{U}_1 = \dot{I} \times (\dot{Z}_{Ql} + \dot{Z}_{Qo} + 3\dot{Z} \times (1 + k_o)),$$

wherein $$\dot{Z}_d = \dot{Z}_l = \dot{Z} \text{ and } k_o = \frac{1}{3} \times \dot{Z}_o/(\dot{Z} - 1)$$

$$\dot{U}_2 = -\dot{I} \times Z_{Ql} \text{ and } \dot{U}_o = -\dot{I} \times \dot{Z}_{Qo}.$$

Furthermore, we obtain the following phase voltages for $a = e^{j120°}$ :

$$\dot{U}_R = 3 \dot{I} \times (1 + k_o) \times \dot{Z},$$

$$\dot{U}_S = \dot{I} \times (a^2 \dot{Z}_{Ql} + a^2 \dot{Z}_{Qo} + 3a^2 \dot{Z}(1+k_o))$$

and $$\dot{U}_T = \dot{I} \times (a\dot{Z}_{Ql} + a\dot{Z}_{Qo} + 3a\dot{Z}(1 + k_o)).$$

Therefore, we obtain for the interphase voltage $U_{ST}$:

$$U_{ST} = \dot{I} \times (2(a^2-a)\dot{Z}_{Ql} + (a^2-a)\dot{Z}_{Qo} + 3(a^2-a)\dot{Z}(1+k_o))$$

$$= -3\sqrt{3} \times j \times (1 + k_o) \times \dot{I} \times \left\{ \frac{2\dot{Z}_{Ql} + Z_{Qo}}{3(1 + k_o)} + \dot{Z} \right\}.$$

Then the difference between the phase voltage $\dot{U}_R$ and a percentage of the interphase voltage $\dot{U}_{ST}$, determined by means of the factor $k$ (less than unity), is formed in terms of a subtractive comparison, and this difference is equated with a predetermined threshold value (in the present example the critical value is zero) in order to carry out a threshold comparison. All this means is the equation of $\dot{U}_R$ on the one hand and $k \times \dot{U}_{ST}$ on the other hand, with the following result (there having been introduced, in addition to the resistive and reactive components R and $jX$ of the line impedance $\dot{Z}$, a modified source impedance $\dot{Z}'$ comprising components $R'$ and $jX'$.

$$\dot{Z}' = \frac{2\dot{Z}_{Ql} + \dot{Z}_{Qn}}{3(1 + k_o)}, |\dot{Z}| = k \sqrt{3} |\dot{Z}' + \dot{Z}|,$$

$$\left( R - \frac{3k^2}{1 - 3k^2} \times R' \right)^2 + \left( X - \frac{3k^2}{(1 - 3k^2)^2} \times X' \right)^2 =$$

$$= \frac{3k^2}{(1 - 3k^2)^2} (R'^2 \times X'^2)$$

Figure 2B:
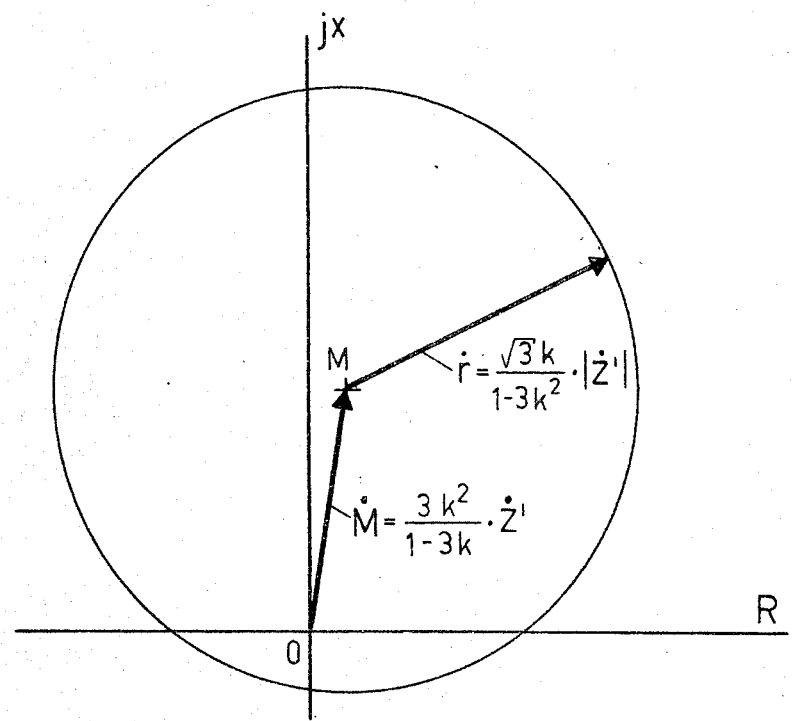
FIG. 2b shows a characteristic representing the line impedance as the response limit in a fault localization process according to the invention.

Again, using the reference symbols according to FIG. 2b:

$$(R - R_o)^2 + (X - X_o)^2 = r^2$$

with $M(R_o, X_o)$ $$R_o = \frac{3k^2}{1 - k^2} \times R'$$

$$X_o = \frac{3k^2}{1 - 3k^2} \times X'$$

$$r = \frac{\sqrt{3}k}{1 - 3k^2} \times |Z'|.$$

The last equation which represents the condition for the equality of the values of the two compared voltages is represented by a circle in the plane of coordinates R and X. This circle is shown in FIG. 2b with the expressions for the radius and the centre coordinates resulting from the last-mentioned equation.

For the purposes of practical application this means that it is merely necessary to ascertain the sign of the difference between the values of the two compared voltages that may be rectified in order to determine whether the end point of the vector of the line impedance between test location and fault location is situated within or without the trip circle according to FIG. 2b. In this way it is possible to obtain in simple manner not only a fault detection signal, but also a fault location signal within the line impedance range determined by the trip circle.

Below we quote the result of a similar voltage comparison, but this time for two phase voltages. The result is again a circular trip characteristic with the same equations for the centre coordinates and the radius, but this time based on the changed expression for the modified source impedance, which can be gathered from the last equation, namely:

$$|\dot{Z}| = k \times |\dot{Z}' + \dot{Z}|,$$

$$\dot{Z}' = \frac{(1 - a^2)\dot{Z}_{Ql} + (1 - a)\dot{Z}_{Qo}}{3(1 + k_n)}.$$

Figure 3:
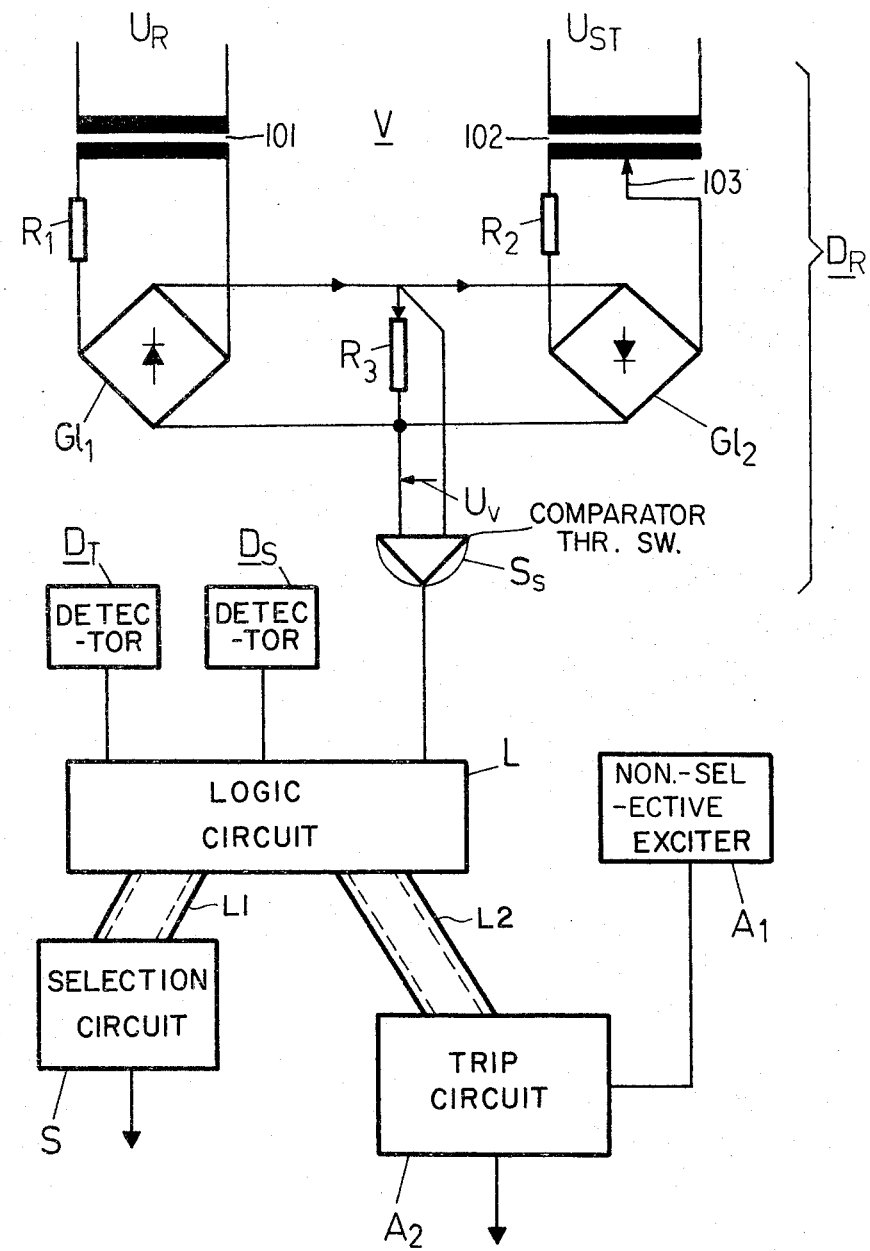
FIG. 3 shows, by way of example, a circuit arrangement for carrying out the fault detection method of the invention for two network voltages.

In the circuit arrangement according to FIG. 3, a phase voltage $U_R$ and an interphase voltage $U_{ST}$ is taken, via a transformer in each case, to a rectifier ($Gl_1$ and $Gl_2$ respectively), the latter voltage via a tapping St set in accordance with the factor $k$. In accordance with the above derivation, it is possible to use a phase voltage as the second voltage if desired. Also, an interphase voltage different from that opposing the first phase voltage may be chosen as the comparison voltage, i.e. in the present example one of the voltages $U_{RS}$ or $U_{TR}$. Depending on whether a phase voltage or an interphase voltage has been chosen as the second comparison voltage, the factor $k$ must be determined by taken into account the desired response range on a line section or network region. When using a phase voltage and an interphase voltage, the maximum value of factor $k$ should be based on the normal ratio between these two voltages, i.e. it should be based on the expression $1/\sqrt{3}$, because beyond this value it is not possible to achieve equality in normal operation. Actually, other values may also be used for this factor, if corresponding restrictions of the trip characteristic or compensation by means of a threshold value different from zero as a reference for the comparison signal is provided.

Figure 5:
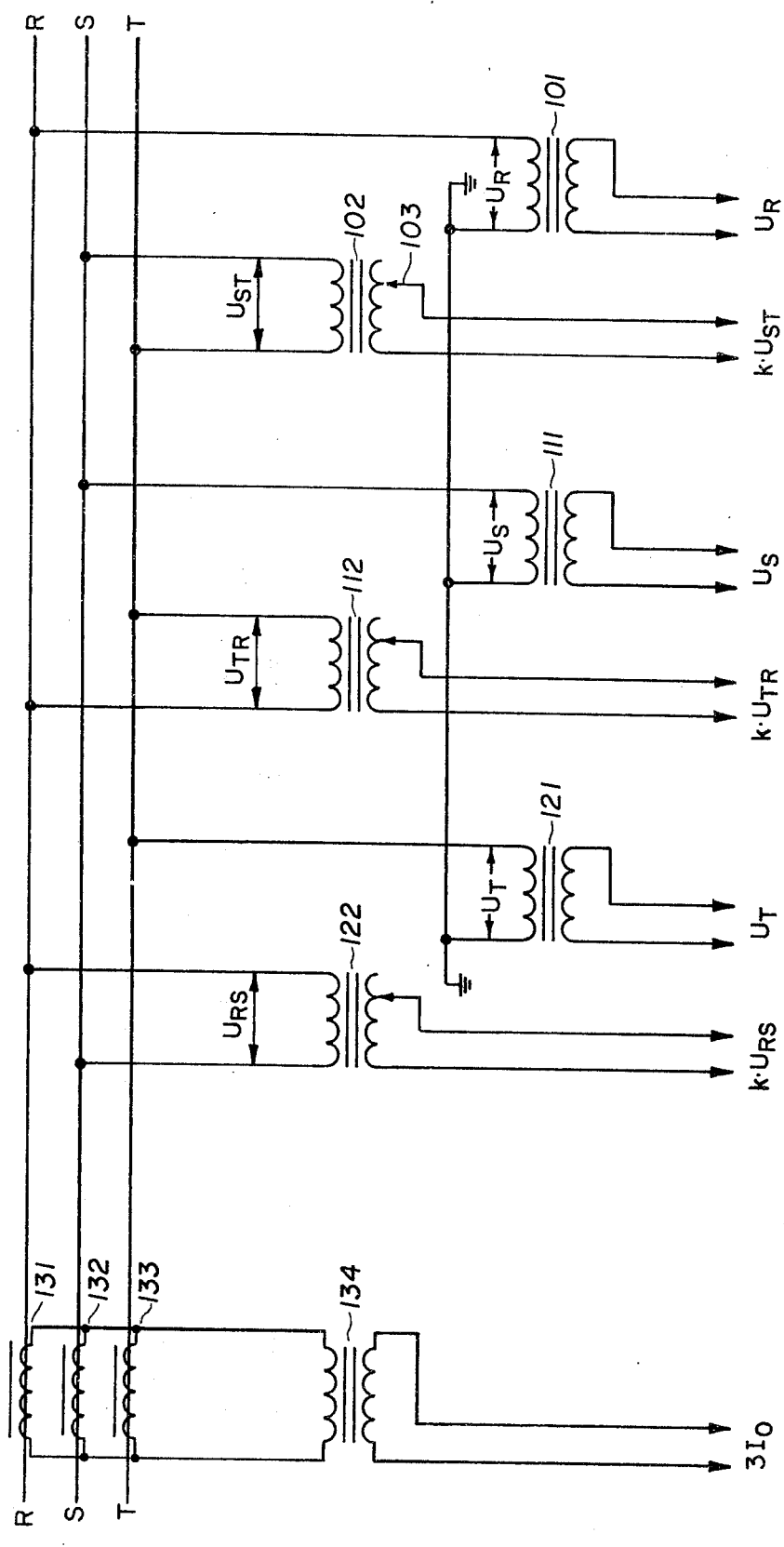
FIG. 5 is a diagram of the connections of the circuits of FIG. 4 to the three-phase line.

In the circuit arrangement of FIG. 3 adequate series resistors $R_1$ and $R_2$ ensure a high internal resistance in the rectifiers which act as signal sources. The series connection of the dc outputs of these sources shown in the drawing ensure that a current corresponding to the difference between the two rectified currents passes through the common shunt resistance $R_3$. A direct-voltage signal $U_v$ can therefore be derived across the latter which corresponds to the difference between $U_R$ and $k \times U_{ST}$ and which is taken to the threshold switch $S_s$, set for example to the critical value zero. The voltages $U_R$ and $U_{ST}$ are provided respectively through transformers 101 and 102 to rectifiers G11 and G12 respectively. Transformer 102 has a relative step down for inserting the factor $k$, and may have a tap 103 to set the value of $k$. The connections on the line side of these transformers and those of their counterparts in $D_S$ and $D_T$ are shown in FIG. 5.

The two rectifiers with their common shunt and common output thus form a comparision circuit V in terms of the present invention which, together with the threshold switch $S_s$, constitutes a fault detector $D_R$. The output of the latter or of the threshold switch $S_s$ therefore supplies a signal for which the sufficient condition is the existence of a single-phase short-circuit to earth on the associated phase R. This condition is not sufficiently exclusive, because in the case of a two-phase short-circuit on phases R and T according to FIG. 1c, for example, the output of $D_R$ would likewise become operative. In a complete monitoring arrangement, therefore, also the other phases would have to be provided with a detector $D_S$ and $D_T$, and the outputs of all detectors would have to be combined in a logic circuit L the layout and function of which will still be explained in further detail with reference to FIG. 4. The multi-channel outputs $L_1$ and $L_2$ of this logic circuit supply for each fault condition a set of signals characterizing the type of fault and, possibly, by further means not here shown or described, the location of the fault within a network region or line section. These signals may be used, on the one hand, for driving a conventional selection circuit S, followed possibly by a distance protection or other type of protection system, or, on the other hand, in conjunction with a nonselective excitation system $A_1$, for example, a simple overcurrent protection, for the selective control of a trip circuit $A_2$. The last-mentioned control system may also operate in such a way, for example, that the non-selective excitation equipment at first triggers or prepares a more or less global disconnection, whereas the selection signals cause suitably selective blocking of the tripping device or the reconnection exclusively of the selected fault region via the output $L_2$.

Figure 4:
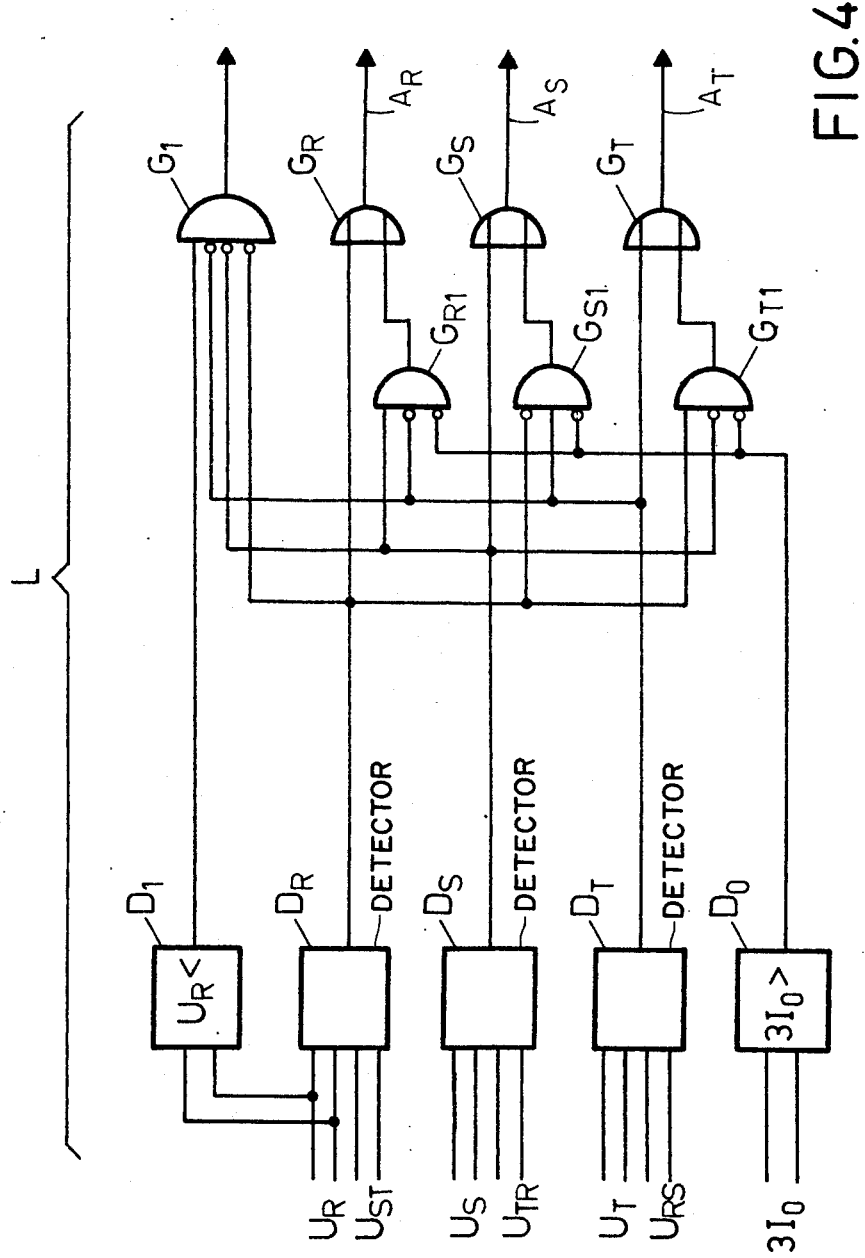
FIG. 4 is an expanded circuit arrangment for fault identification in a three-phase system.

FIG. 4 illustrates the layout of a logic circuit L in detail. Provided are three-phase fault detectors $D_R$, $D_S$, $D_T$ and a zero current detector $D_o$, as well as a phase voltage monitor $D_1$, the latter responding to an abnormal phase voltage decrease with an affirmative output signal. $D_o$ is responsive to the current commonly designated as $3I_o$, which is the zero phase sequence combined component of the line current. The measuring or detecting of this current component is already known in connection with other fault detection systems. Also provided are three OR elements $G_R$, $G_S$, $G_T$ and three AND elements $G_{R1}$, $G_{S1}$, $G_{T1}$, and a further AND element $G_1$. The operative connection and function of these logic elements is as follows:

When a single-phase short-circuit to earth occurs, the particular phase fault detectors deliver an affirmative output signal directly via the associate OR gates. If none of the detectors responds in this way, this does not necessarily signify the absence of a fault, because in the case of a three-phase short-circuit all phase voltages decrease approximately to the same extent and therefore symmetrical conditions are restored, so that voltages comparisons resemble the normal condition. A logic link between the three phase fault detectors may therefore be utilized as a balance indicator. But the phase voltage monitor $D_1$ distinguishes the fault condition from the normal condition as such, i.e. non-selectively, and this, in conjunction with the balance indication via the negating inputs of the logic element $G_1$, produces an unequivocal identification of the three-phase short-circuit by the affirmative output signal of this logic element.

Figure 1C:
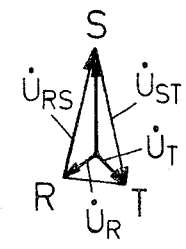
Figure 1D:
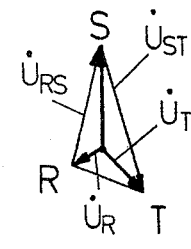

In the case of a two-phase short-circuit with a substantially symmetrical decrease of the two phase voltages concerned according to FIG. 1c, both associated phase fault detectors will respond and thus identify this fault unequivocally. However, if in the case of a two-phase short-circuit one phase voltage at the test point decreases more strongly than the other — as is usual — then in the assumed case of a comparison of the phase voltages with the respective opposite interphase voltage, the response signal of the less strongly decreasing phase voltage may remain absent, which would mean an approximation to the normal condition of the voltage ratio concerning the less strongly decreasing phase voltage. In that case, one element from among the logic elements $G_{R1}$, $G_{S1}$, $G_{T1}$ which receives a signal at its affirmative input from the responding phase fault detector, in conjunction with the negation of a "zero current" (i.e. of a $3I_o$ current) as a sign which proves that there is no single-phase short-circuit and in conjunction with the negation of a phase fault concerning the adjacent phase which is not the preferred phase in relation to the responding phase, concerning, that is, the phase which does not tend to produce a stronger voltage decrease in the case of a two-phase short-circuit, produces an equivalent phase fault signal via a corresponding negating input by means of the appropriate OR gate $G_R$, $G_S$ or $G_T$. In other words, the detectors $D_R$, $D_S$ and $D_T$ alone are enough to identify more or less symmetrical two-phase faults as well as to identify faults of a single phase either to ground or very unsymmetrically to another phase, but the circuit of FIG. 4 is needed to distinguish the latter two, as well as to detect 3-phase faults.

FIG. 5 shows the connections of the circuit of FIG. 4 to the three-phase line being served. The transformers 101 and 102 are in $D_R$, as shown in FIG. 3, and likewise, 111 and 112 are part of $D_S$ and 121 and 122 are part of $D_T$. 101, 111, and 121 are shown as 1:1 transformers, but of course they can have some other ratio, provided that 102, 112, and 122 are correspondingly constituted with a further difference in ratio to apply the coefficient $k$. Transfomers 131, 132, and 133 are line current transformers, while isolation transformer 134 is not strictly necessary.

To sum up, the following advantages accrue from the described method and device of the invention:

All fault conditions are correctly identified, including balanced faults and distortions in the case of two-phase short-circuits. In the latter case, the preferred direction of the phase sequence is determined by the generally inductive character of the line impedance. Moreover, the system is characterized by its lack of response to balanced oscillations, etc. The range of the response limit can be made very large. There is automatic adaptation to different source impedances, because the arc current reduces with increasing source impedance and, therefore, the arc resistance included in the line impedance rises accordingly. This is tantamount to a compensatory variation of the tripping characteristic through the factor $k_o$. The system is characterized by its great simplicity and low cost.

The invention has been described with reference to an illustrative embodiment, but modifications can be made within the inventive concept. For example, instead $U_R$, either $U_S$ or $U_T$ could be monitored by $D_1$, since the information is needed only when all three phase voltages drop together (i.e., when there is no sufficient asymmetry to trigger at least one of the output switches respectively of $D_R$, $D_S$ and $D_T$). The voltages $U_R$, $U_S$ and $U_T$ between the respective phases of the 3-phase line and ground are referred to as "phase voltages" for short.

Reference to "affirmative" and "negative" signals of a certain condition refer respectively to logically noninverted and logically inverted signals corresponding to the condition.

What is claimed is:

1. A method for determining faults in a grounded-neutral three-phase network comprising the steps of preparing a first signal representing the amplitude of a first phase-to-ground voltage ($U_R$), preparing a second signal representing the amplitude of the interphase voltage ($U_{ST}$) between the two other phases, comparing said first and second signals and generating a fault signal ($F_R$) in dependence on such comparison signal exceeding a predetermined critical value ($U_o$).

2. Method according to claim 1, in which the preparing of said first and second signals is such as to make them proportional to the amplitudes of said first phase-to-ground voltage and said interphase voltage respectively, and in which said comparison signal is derived as the difference between said first and second signals, and in which also the preparing of said first and second signals is so carried out that the proportionality coefficients of said first and second signals have a predetermined ratio to one another.

3. Apparatus for determining faults in a grounded-neutral three-phrase network, comprising:
   amplitude comparison means (V) having a first input operatively connected to a first phase-to-ground voltage ($U_R$) and a second input operatively connected to the interphase voltage ($U_{ST}$) between the two other phases, and
   a threshold switch ($S_s$) responsive to the output of said amplitude comparison means.

4. A method for determining faults in a grounded-neutral three-phase network comprising the steps of preparing a first signal proportional to the amplitude of a first phase voltage ($U_R$) relative to ground by rectifying an alternating voltage derived from said first phase-to-ground voltage, preparing a second signal proportional to the amplitude of the interphase voltage ($U_{ST}$) between the two other phases by rectifying an alternating voltage derived from said interphase voltage with the same proportionality factor as the one used in the preparation of said first signal, comparing said first and second signals to derive a comparision signal ($U_v$) coresponding to the difference between said first and second signals, and generating a fault signal ($F_R$) in dependence on such comparision signal exceeding a predetermined critical value ($U_o$).

5. A method for determining faults in a grounded-neutral three-phase network comprising the steps of preparing a set of first signals respectively representing the amplitude of each phase-to-ground voltage ($U_R$, $U_S$, $U_T$), preparing a set of second signals respectively representing the amplitudes of each of the interphase voltages ($U_{ST}$, $U_{RT}$, $U_{RS}$) between the phases taken two at a time, comparing each signal of the first set with the signal of the second set representing the interphase voltage between the two phases other than the phase of which the amplitude is represented by the signal of the first set with which it is compared, deriving a comparison signal ($U_v$) from each such comparison which represents an amplitude relation between the two compared signals, generating a fault signal ($F_R$) in dependence upon any of said comparison signals exceeding a predetermined critical value ($U_o$) and utilizing affirmative values of the respective fault signals so formed from the respective comparison signals as a sign for a one-phase short-circuit to earth within the supervised section of the network with respect to the relevant phase.

6. Method according to claim 5, in which a logical AND operation is performed with respect to the negating fault signals of all phases and in which in response to the affirmative output of this logical AND operation, a signal is produced which is utilized as a sign for phase-to-ground and interphase voltage conditions symmetrical within predetermined limits.

7. Method according to claim 6, in which an affirmative signal is produced for the decrease of a phase voltage below a predetermined absolute value and in which there is included in the aforesaid logical AND operation, specified in claim 6, in addition to the negating fault signals of all phases, said affirmative voltage decrease signal, and in which, still further, the affirmative output of this AND operation is utilized as a fault signal indicating a threephase short-circuit.

8. A method for determining faults in a grounded-neutral three-phase network comprising the steps of preparing a set of first signals respectively representing the amplitude of each phase-to-ground voltage ($U_R$, $U_S$, $U_T$), preparing a set of second signals respectively representing the amplitudes of each of the interphase voltages ($U_{ST}$, $U_{RT}$, $U_{RS}$) between the phases taken two at a time, comparing each signal of the first set with the signal of the second set representing the interphase voltage between the two phases other than the phase of which the amplitude is represented by the signal of the first set with which it is compared, deriving a comparision signal ($U_V$) from each such comparison which represents an amplitude relation between the two compared signals, generating a fault signal ($F_R$) in dependence upon any of said comparison signals exceeding a predetermined critical value ($U_o$), forming a zero phase sequence current in response to the line currents and subjecting said zero phase sequence current to detection to provide signals relating thereto having two states, respectively affirmative and negating, peforming a logical AND operation with respect to the affirmative condition of the aforesaid fault signals respectively related to each comparison signal, in each case with the negating condition of the corresponding fault signal relating to a second of said comparison signals having a predetermined relationship in phase sequence to the first-mentioned of said comparison signals and the negating condition of said detected zero phase sequence current signal, the said comparison signals being identified by the phase of which the phase-to-ground voltage participates in its formation for the purpose of defining said predetermined relationship, and utilizing the affirmative output condition of any of said logical AND operations to provide an equivalent fault signal serving as a sign for a two-phase short-circuit involving the phase identifying the first-mentioned comparison signal which produced the said affirmative fault signal and the third phase, said third phase being the phase other than the phase identifying said first comparison signal and the phase identifying said second comparison signal.

9. Apparatus for determining faults in a grounded-neutral three-phase network, comprising:
an amplitude comparison means (V) for each phase, each said amplitude comparison means having a first input operatively connected to a first phase-to-ground voltage different in each case ($U_R$, $U_S$, $U_T$) and a second input operatively connected to the interphase voltage ($U_{ST}$, $U_{RT}$, $U_{RS}$) between the two phases other than said first phase,
threshold switches ($S_s$) respectively responsive to the output of each of said amplitude comparison means, and
means for connecting the outputs of said threshold switches to the selector of the excitation system of a network protection assembly.

10. Apparatus according to claim 9, in which there is provided a zero-phase sequence current detector ($D_0$) responsive to zero-phase sequence current derived from the line currents and in which, also, a logic circuit is provided for the connection of said threshold switch outputs to said excitation system selector, in which logic system there is provided for each phase an excitation output ($A_R$, $A_S$, $A_T$) which is connected to the output of a two-input OR-gate ($G_R$, $G_S$, $G_T$) having one input connected to the threshold switch of the relevant phase and the other connected to the output of an AND-gate ($G_{R1}$, $G_{S1}$, $G_{T1}$), said AND-gate having in each case an affirmative input connected to the threshold switch of the cyclically subsequent phase, a negating input connected to the threshold switch of the cyclically preceding pahse and a negating input connected to said zero-phase sequence current detector ($D_o$).

11. Apparatus according to claim 10, in which said logic system includes also phase voltage monitor means ($D_1$) and a supplementary AND-gate ($G_1$) having three negating inputs respectively connected to the outputs of the threshold switches of the three phases and having an affirmative input connected to the output of said phase voltage monitor ($D_1$), and in which apparatus there are provided means for indicating a three-phase short-circuit having an input connected to the output of said supplementary AND-gate ($G_1$).

12. Apparatus for determining faults in a grounded-neutral three-phase network, comprising:
an amplitude comparision means (V) for each phase, each said amplitude comparison means having a first input operatively connected to a first phase-to-ground voltage different in each case ($U_R$, $U_S$, $U_T$) and a second input operatively connected to the interphase voltage ($U_{ST}$, $U_{RT}$, $U_{RS}$) between the two phases other than said first phase,
threshold switches ($S_s$) respectively responsive to the output of each of said amplitude comparison means, and
a non-selective excitation system and means for connecting the outputs of said threshold switches and of said non-selective excitation system to the selective trigger device of a network protection assembly.

13. Apparatus according to claim 12, in which a zero-phase sequence current detector ($D_o$) responsive to a zero-phase sequence current derived from the line currents is provided and in which output the connection of said threshold switches to said selective trigger device is made through a logic circuit providing an excitation output ($A_R$, $A_S$, $A_T$) for each phase which output is connected in each case to the output of a two input OR-gate ($G_R$, $G_S$, $G_T$) having one input connection to the output of the threshold switch of the relevant phase and the other connected to the output of an AND-gate ($G_{R1}$, $G_{S1}$, $G_{T1}$), said AND-gates each having an affirmative input connected to the threshold switch of the cyclically subsequent phase, a negating input connected to the threshold switch of the cyclically preceding phase and a negating input connected to said zero-phase sequence current detector ($D_o$).

14. Apparatus according to claim 12, in which said logic system includes also phase-to-ground voltage monitor means ($D_1$) and a supplementary AND-gate ($G_1$) having three negating inputs respectively connected to the outputs of the threshold switches of the three-phases and having an affirmative input connected to the output of said phase-to-ground voltage monitor ($D_1$), and in which apparatus there are provided means for indicating a three-phase short-circuit having an input connected to the output of said supplementary AND-gate ($G_1$).

* * * * *

UNITED STATES PATENT AND TRADEMARK OFFICE
CERTIFICATE OF CORRECTION

PATENT NO. : 3958153
DATED : May 18, 1976
INVENTOR(S) : Venkat NARAYAN

It is certified that error appears in the above-identified patent and that said Letters Patent are hereby corrected as shown below:

In column 8 of the patent, claim 7, line 33, where "phase" appears, it should be changed to -- phase-to-ground --.

Signed and Sealed this

Seventh Day of June 1977

[SEAL]

Attest:

RUTH C. MASON
Attesting Officer

C. MARSHALL DANN
Commissioner of Patents and Trademarks